Mar. 13, 1923.
P. J. SIMMEN
SPEED CONTROL SYSTEM FOR VEHICLES
1,448,466
Filed June 29, 1921
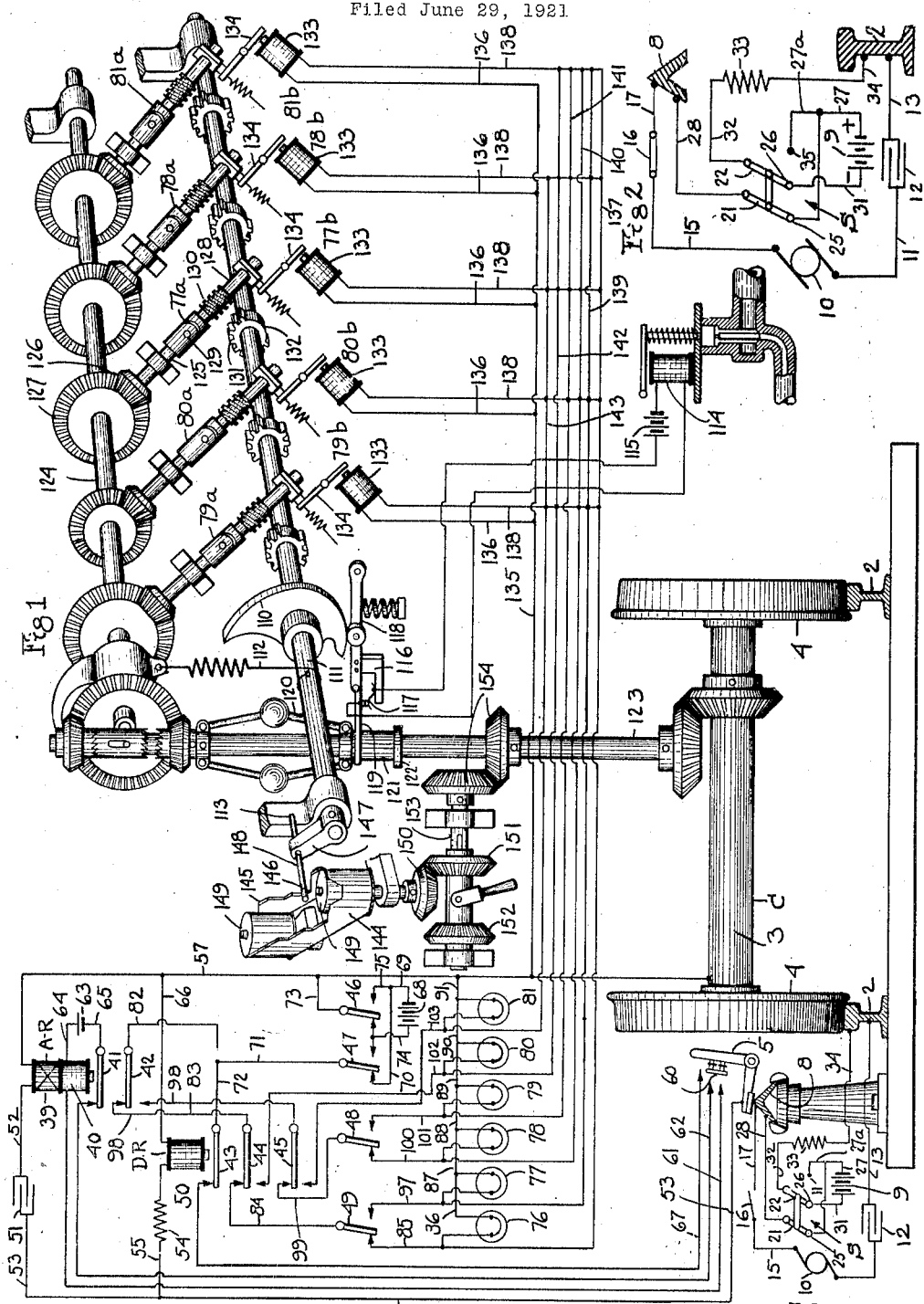
PAUL J. SIMMEN
INVENTOR
BY John S. Powers
ATTORNEY Patented Mar. 13, 1923.

1,448,466

UNITED STATES PATENT OFFICE.

PAUL J. SIMMEN, OF EDEN, NEW YORK.

SPEED-CONTROL SYSTEM FOR VEHICLES.

Application filed June 29, 1921. Serial No. 481,281.

*To all whom it may concern:*

Be it known that I, PAUL J. SIMMEN, a citizen of the United States, residing at Eden, in the county of Erie and State of New York, have invented certain new and useful Improvements in Speed-Control Systems for Vehicles, of which the following is a specification.

This invention relates to speed control systems for vehicles. The invention consists broadly in the operative combination in a system of vehicle speed control of means responsive in operation to particular trackway conditions for selectively effecting special speed control operations such as the establishment of sub-maximum permissive speeds or speed reduction curve compensation and track hazard indicator means for selecting and effecting speed control operations in relation to permanent hazards.

The invention also consists of a novel combination and arrangement of parts wherein the shafts of the controlling element is acted on by the track hazard indicator so called and is additionally operated from the axle of the vehicle to effect the operative movement of the controlling element by means (as disclosed in my pending application No. 463,324) normally inoperative under uniformly normal closed circuit conditions.

An illustrative physical embodiment of the invention in which its principles are applied is disclosed in the drawing wherein:

Figure 1 is a schematic view of the system, and

Figure 2 is a detailed view to show the track-way circuits.

For the purpose of illustration I have selected as the circuits for creating the different conditions to which the speed control mechanism is responsive the cab circuits and track-way circuits which are disclosed in my application for patent, Serial No. 369,131. In accordance with the standard practice I have also shown signal lamps in the several cab circuits.

A car C is illustrated as being on the rails 2 by the showing of the axle 3 and the wheels 4. The car carries relays A R and D R which are used to control the devices responsive to different cab circuit conditions. These devices, in accordance with the present invention, are elements of the speed control mechanism and with them may be combined other devices such as the signal lamps 76 to 81 by which the existence of the different conditions may be made manifest and whose use broadly considered simply conforms to standard practice. In order appropriately to control the relays A R and D R the car is provided with a shoe 5 pivoted or otherwise suitably mounted for movement. The shoe 5 operates electrical contacts and contacts with and is lifted and controlled by the ramp 8 positioned alongside of a rail 2. The shoe 5, by its contact with the ramp 8, is effective for its intended purpose, that is to say the control of the relays A R and D R, by virtue of a source of direct current 9 and a source of alternating current 10, both provided on the track-way.

One terminal of the alternating current generator 10 is connected to one rail 2 by means of wire 11, condenser 12 and wire 13 and the other terminal of the generator 10 is connected to ramp 8 by means of wire 15, hand-switch 16 and wire 17. The source of direct current 9, herein illustrated as a battery, is also connected to the rail 2 and ramp 8. Since it is desired at times to have the ramp 8 connected with a positive terminal of the source 9 and the rail 2 connected with the negative terminal of said source, while at other times it is desired to have ramp 8 connected with the negative terminal and the rail 2 connected with the positive terminal, the reversing switch S is interposed between the source 9 on the one hand and the rail 2 and the ramp 8 on the other hand.

When the arms 21 and 22 of the switch S are, as shown, in contact with the points 25 and 26 respectively, then the ramp 8 is positively energized, that is to say is connected to the positive terminal of the source 9, the connection being as follows: wire 27, point 25, arm 21 and wire 28 to ramp 8. At the same time the rail 2 is connected to the negative terminal of the source 9 as follows: wire 31, point 26, arm 22, wire 32, choke coil 33, and wire 34 to rail 2. The ramp 8 is negatively energized, that is to say connected with the negative terminal of the source 9, by moving the arms 21 and 22 of the switch S into contact with the points 26 and 35 respectively, so that the connection from the negative terminal of the source 9 to the ramp 8 is as follows: wire 31, point 26, arm 21 and wire 28 to ramp 8. At the same time the rail 2 is connected to the positive terminal of the source 9 as follows: wires 27 and 27ª point 35, arm 22, wire 32, choke coil 33 and wire 34 to rail 2.

When it is desired that the ramp 8 shall be neither positively or negatively electrified, the arms 21 and 22 of the switch S are moved out of contact with the points 25, 26 and 35. Similarly the switch arm 16 may be manipulated to break the track-way circuit through which the alternatng current flows.

The relay A R is double wound, that is to say it has a coil 39 and a coil 40. This relay also has two armatures 41 and 42 which are in the upper position, as shown, when either of the coils 39 or 40 is energized but move to their lower positions when both of the coils are de-energized.

The relay D R has armatures 43, 44 and 45, which, when the relay is energized, are in the upper positions as shown but when the relay is de-energized are in their lower positions. The relay D R also includes polarized armatures 46, 47, 48 and 49. These armatures swing from left to right as viewed in the drawing. When the relay D R is energized positively, that is to say when the current enters relay D R by wire 50, then all of the armatures 46 to 49 inclusive swing to the left to the positions as shown in the drawing. When, however, the relay D R is negatively energized, that is to say when the current leaves by the wire 50, then all the armatures 46 to 49 inclusive swing to right hand positions, corresponding to the left hand positions as shown in the drawing.

The coil 39 of relay A R is to be operated by alternating current only and to insure this the condenser 51 is inserted between the wires 52 and 53. On the other hand it is the intention to have relay D R operated by direct current only and to insure this the choke coil 54 is inserted between the wires 50 and 55.

Assuming the car C to be advancing with shoe 5 in contact with ramp 8 and alternating current supplied to said ramp from the generator 10, under such conditions the alternating current will flow by the wire 53, condenser 51 and wire 52 through coil 39 of relay A R and thence by wire 57, axle 3, wheel 4, rail 2, wire 13, condenser 12 and wire 11, thus returning to the generator. The resultant energization of relay A R causes armatures 41 and 52, if in their lower positions, to be raised or, if already raised, to be held in raised positions. Ramp 8 is, as usual, inclined on both ends and thus permits shoe 5 gradually to lower as the car C passes the ramp, so that the insulated metallic plate 60 mounted on the shoe connects wires 61 and 62 before the shoe 5 actually leaves the ramp. The connection of wires 61 and 62 by the shoe 5 while the armature 41 is in a raised position causes a stick circuit to be formed through the coil 40 of the relay A R, which circuit maintains the relay A R energized until the advancing car C causes the shoe 5 to contact with another ramp 8. This stick circuit is as follows: one terminal of battery 63, wire 64, coil 40, wire 61, plate 60, wire 62, armature 41 in a raised position and wire 65 to the other terminal of battery 63.

If the ramp 8 be positively energized, assuming the car advancing and the shoe 5 in contact with the ramp, direct current will flow through the relay D R, entering by wire 50. The circuit is as follows: ramp 8, wire 53, wire 55, choke coil 54, wire 50, relay D R, wires 66 and 57, axle 3, rail 2 and wire 34 to the other side of source 9, the conducting arms 21 and 22 being in contact with the points 25 and 26 respectively. As the car passes beyond the ramp the shoe 5 will make contact with the wire 67 so that, the armature 43 being in a raised position, a stick circuit for relay D R will be formed as follows: one terminal of the battery 68, wires 69 and 70, polarized armature 47 in its left hand position by reason of the positive energization of relay D R, wires 71 and 72, armature 43, wire 67, shoe 5, wires 53 and 55, choke coil 54, relay D R, wires 57 and 73, polarized armature 46 and wire 74 to the other terminal of battery 68. The current flowing in the above traced path will maintain the relay D R energized while the car C is passing between ramps.

If switch S be reversed so that its arms 21 and 22 are in contact with the points 26 and 35 respectively and the ramp 8 is negatively energized and also if the car be advancing and the shoe 5 in contact with the ramp the positive current will flow from wire 34 to rail 2, the circuit then being as follows: wheel 4, axle, 3, wires 57 and 66, relay D R, wire 50, choke coil 54, wires 55 and 53, shoe 5, ramp 8 and thence by wire 28 to the negative terminal of the source 9. The current flowing in the above traced path will negatively energize relay D R and so cause the polarized armatures 46 to 49, inclusive, to swing to right hand positions corresponding to the left hand positions as shown in the drawing. The negative energization of relay D R is maintained by a stick circuit as follows: battery 68, wire 69, polarized armature 46 in the right hand position, wires 73, 57 and 66, relay D R, wire 50, choke coil 54, wires 55 and 53, shoe 5, wire 67, armature 43, wires 72 and 71, polarized armature 47 in the right hand position and wire 74 to the other terminal of the battery 68.

It will, of course, be understood that whether relay D R is energized positively or negatively, the armatures 43, 44 and 45 will be in the upper positions and it will be only when relay D R is not energized at all that these armatures are in the lower positions. It will also be understood that polarized armatures 46 to 49 inclusive will remain in the positions to which they have last been moved until the relay D R has been reversely energized.

The speed control system utilizes a controlling element, preferably a cam 110, which by its position at any given moment determines and limits the permissive maximum speed in accordance with changing trackway conditions and hazards. According to the invention the speed controlling element, i. e., the cam 110 is combined with means of operation responsive to particular trackway conditions and with other means which controls and effects the operation of said element in accordance with permanent hazards. These means and the manner of their co-operation with the speed controlling element and with one another will now be described and I will first describe the means of operation responsive to particular trackway conditions.

The cam 110 is mounted on an operating shaft 111 and is constantly subject to the action of a spring 112 which may be connected to said shaft and which moves the cam in a direction to permit the speed of the train to be increased, such movement of the cam being limited by a stop pin 113. A train pipe release valve is illustrated at V and is operated by a magnet 114, the construction being such that the valve is closed so long as the magnet is energized but opens upon its deenergization. The magnet 114 is in circuit with a battery 115, the circuit having the relatively movable terminal contacts 116 and 117. The contact 116 is secured to a pivoted arm 118 operated by the cam 110 and held by a spring in bearing engagement with said cam. The contact 117 normally bears as a spring on the contact 116 and is secured to a forked bar 119 which is pivoted at the end of the arm 118 and is operated by a centrifugal governor 120, the forked end of the bar 119 fitting over the sleeve 121 whose movement is effected by the weighted arms of the governor. The sleeve 121 is provided with a flange 122 which at times acts on the bar 119 to cause the separation of the contacts 116 and 117. The governor 120 is mounted on a shaft 123 which is driven from the wheels 4 by suitable gearing. It will be apparent that as the arm 118 is moved downward by the cam 110 the first effect will be the disengagement of the contacts 116 and 117 with resultant opening of the circuit of the valve V and operation of said valve to set the brakes. It will also be apparent, assuming a lowered position of the arm 118, that the reengagement of the contacts 116 and 117 will be effected only as the sleeve 121 moves downward proportionately to the movement of said arm whereby the flange 122 will permit the bar 119 to assume its normal position relative to the arm 118.

The shaft 123 drives a countershaft 124 which in turn drives a number of unit gear connections and an important feature of the invention is the automatic selection of the gear connections by means responsive to different circuit conditions. The gear connections are employed for the operation of the cam shaft 111 and while similarly constructed differ from one another in some detail of their elements so that each gear connection will produce a particular operation of the cam shaft 111 and a particular resultant phase of train control different from the operations and resultant train control phases produced by the other gear connections.

The cab and track circuits described provide for six different circuit conditions pursuant to which six phases of speed control, each responsive to a particular circuit condition, may be utilized in the embodiment disclosed. As shown there are five unit gear connections between the countershaft 124 and the cam shaft 111 and these gear connections, in the order of their relation to the respective circuits in which the signal lamps 77 to 81 inclusive may be inserted, are designated and distinguished as $77^a$, $78^a$, $79^a$, $80^a$ and $81^a$. Each of these gear connections may be operated to produce a particular phase of speed control and thereby five phases of speed control are available. The sixth and normal phase of speed control, that is to say the absolute maximum speed, is produced by maintaining the five unit gear connections, $77^a$ to $81^a$ inclusive, simultaneously inoperative.

In the embodiment disclosed the unit gear connections are similarly constructed and the description of this paragraph applies to all of them. Each unit gear connection comprises a shaft 125 carrying a bevel gear 126 in mesh with a bevel gear 127 on the shaft 124, an extension shaft 128 connected by a universal joint 129 to the shaft 125 and provided with a worm 130, and a worm wheel 131 mounted on the cam shaft 111 for engagement with the worm 130, the worm wheel 131 having a mutilation or interruption 132. It will be apparent that the gear connection is rendered inoperative if the extension shaft 128 be so held that the worm 130 will not mesh with the worm wheel 131. It will also be apparent that if the extension shaft be in its operative position the operation of the gear connection will be limited by the worm wheel mutilation 132, whose length thus determines the particular speed limit position of the cam 110, and also that the worm will co-operate as a stop or detent with an adjacent end tooth of the worm wheel to limit the movement of the cam shaft 111 by the spring 112. This latter feature is of value when the speed limit is changed from a lower to a higher speed. Thus the shorter the multilation 132 the lower will be the limit of speed established by the cam 110; and if the change be made, for example from the minimum speed limit to either of the sub-maximum speed limits, no operation of the worm wheel 131 of the sub-maximum gear connection, qua worm wheel, takes place but merely the engagement of the end tooth of such worm wheel advancing in the direction effected by the spring 112, in the manner of a stop shoulder against the end of the lowered companion worm 130.

By reason of the relatively large number (six) of phases of speed control the invention not only makes possible a wholly adequate range of permissive running speeds, that is to say absolute maximum, two sub-maximums and minimum but also makes possible the acceleration or retardation of the movement of the speed controlling cam 110 in providing for a definite speed limit, i. e., the minimum limit, in order to compensate for change of grade conditions (or other track-way conditions, such as permanent hazards) tending to retard or accelerate the speed of the train. This will more clearly appear if it be noted that a train of given weight travelling on the level at given maximum speed has a determined speed reduction curve from maximum to minimum; if now this same train be travelling upgrade its speed will be retarded and the speed reduction curve will be shortened; and if on such up-grade travel a reduction to minimum speed be required this will be certainly effected in conformity to the shorter braking distance if the movement of the cam 110 be accelerated, thereby to enable shortening of the blocks and resultant increase in track capacity. On the other hand if the train be travelling down-grade its speed will be accelerated and the speed reduction curve will be lengthened; and if on such down-grade travel a reduction to minimum speed be required this will be made conformable to the longer braking distance by retarding the movement of the cam, thereby requiring a block of suitably increased length but insuring that the minimum speed limit is established before the train moves into the block ahead.

As previously stated the absolute maximum speed limit for normal running, for example seventy miles per hour, is provided for by the inoperative condition, simultaneously, of all the unit gear connections. The first sub-maximum speed limit, for example fifty-five miles per hour, is provided for by the unit gear connection 77$^a$. The unit gear connection 78$^a$ whose worm wheel mutilation 132 is shorter than the worm wheel mutilation of the unit gear connection 77$^a$, provides for the second sub-maximum speed limit, for example thirty miles per hour, and the unit gear connection 81$^a$, having a still shorter worm wheel mutilation 132, provides for the minimum speed limit, for example ten miles per hour. The unit gear connection 79$^a$, by virtue of the greater diameter and number of teeth of its gear 127, accelerates the action of the cam 110 in establishing a particular speed limit such as the minimum limit and the unit gear connection 80$^a$ by virtue of the smaller diameter and number of teeth of its gear 127 retards the action of the cam 110 in establishing such speed limit.

The combination of phases of different speed limits and phases of accelerating or retarding the movement of the cam 110 in establishing a particular speed limit is preferred. However, it is to be noted that in the mechanism described I have also provided, in combination with sub-maximum speed control or selection, gear ratio control or selection and that other features of speed control, or it might be train control broadly considered, and responsive to gear ratio selection, may be utilized instead of those described.

The extension shafts 128 are normally held to disconnect the worms 130 from the worm wheels 131 by electro-magnets, one for each shaft, and, in the order of their correspondence to the unit gear connections 77$^a$ to 81$^a$ inclusive, these magnets are designated and distinguished as 77$^b$, 78$^b$, 79$^b$, 80$^b$ and 81$^b$. Each of these magnets has a coil 133 and an armature 134 and in the embodiment shown the armatures 134 are utilized, when the coils are energized, to hold the extension shafts 128 in positions wherein the worms 130 will not mesh with the worm wheels 131.

For convenience of description it may be assumed, in accordance with the disclosure of the drawing, that the coils 133 are bridged across the circuits of the lamps 76 to 81 inclusive. This will appear in detail in the further description.

For normal running the ramp 8 may be supplied with alternating current and positive direct current and it may be assumed that the lamp 76 is responsive to the circuit condition thereby established. All of the coils 133 will then be energized and the lamp 76 will glow. The drawing shows the circuit condition which obtains during normal running, that is to say when alternating current and positive direct current is supplied to the ramp 8. In such case relay A R is energized, relay D R is positively energized and the armatures 46 to 49 inclusive are moved to the left as shown. Under these conditions a circuit is formed through the lamp 76 as follows: battery 68, wires 69 and 70, armature 47, wires 71 and 82, armature 42, wire 83, armature 44, wire 84, armature 49, wires 85, 86, 87, 88, 89, 90, 91, 57 and 73, armature 46 and wire 74 to battery 68. The wire 135 common to the coils 133, is connected to said coils by wires 136 and is also connected to the wire 57 and the wire 137, common to the coils, is connected to them by wires 138 and is also connected to the wire 85; thereby the bridged circuit through the coils 133 may be traced as follows, commencing with the wire 85: wires 85, 137, 138, all the coils 133, wires 135, 57, and 73, armature 46 and wire 74 to battery. It will be obvious that when all of the coils 133 are energized no operation of the cam shaft 111 takes place and the cam 110 is thus held by the spring 122 in the position to provide the absolute maximum speed limit for normal running.

The second circuit condition is established when alternating current is supplied to the ramp and the ramp is negatively instead of positively energized as in the preceding instance. The lamp 77 may be assumed to be responsive to this circuit condition. In this case relay A R is energized, relay D R is negatively energized and armatures 46 to 49 inclusive, are moved to the right hand positions. The circuit thus established may be traced as follows: battery 68, wires 69 and 75, armature 46 in the right hand position, wires 73, 57, 91, 90, 89, 88, and 87, lamp 77, wire 97, armature 49 in the right hand position, wire 84, armature 44, wire 83, armature 42, wires 82 and 71, armature 47 in the right hand position, and wire 74 to the other terminal of battery 68. In this case wire 135 acts as a supply wire for the coils 133 and current from said coils is returned by a wire 139 which is connected to the wires 138 of all the coils except the coil of the magnet 77$^b$ and which is also connected to the wire 97. Thereby all of the magnets are energized except the magnet 77$^b$ and this magnet, by its deenergization, effects the selection of the unit gear connection 77$^a$ operatively to connect the cam shaft 111 and the countershaft 124 with resultant movement of the cam 110 to a position wherein the first sub-maximum speed limit is established.

The third circuit condition is established when the ramp 8 is supplied with positive direct current only. The lamp 78 may be assumed to be responsive to this condition. In this case relay A R is deenergized because its stick circuit is broken by the raising of shoe 5 consequent to its contact with the ramp, while relay D R is positively energized and the armatures 46 to 49 inclusive, are moved to the left hand positions as shown in the drawing. The circuit thus established may be traced as follows: battery 68, wires 69 and 70, polarized armature 47, wires 71 and 82, armature 42 in its lower position, wire 98, armature 45, wire 99, armature 48, wire 100, lamp 78, wires 88, 89, 90, 91, 57, and 73, armature 46 in the left hand position and wire 74 to battery 68. In this case the wire 135 serves as the return wire from the coils 133 and the current is supplied by a wire 140 which is connected to all of the wires 138 except that of the magnet 78$^b$ and which is also connected to the wire 100. Thereby the current flows from the wire 100 through all the coils 133 except that of the magnet 78$^b$ and returns by wires 136, 135, 57 and 73, armature 46 and wire 74 to battery 68. It will thus be apparent that all of the magnets are energized except the magnet 78$^b$ and the latter, by its deenergization, selects the unit gear connection 78$^a$ as an operative connection between the countershaft 124 and the cam shaft 111. The unit gear connection 78$^a$ effects the movement of the cam 110 to a position in which the second sub-maximum speed limit is established.

The fourth circuit condition is established when the ramp 8 is supplied only with negative direct current. The lamp 79 may be assumed to be responsive to this circuit condition. In this case the relay A R is deenergized and the relay D R is negatively energized and thereby moves the polarized armatures 46 to 49 inclusive to the right hand positions corresponding to the left hand positions shown in the drawing. The circuit thus established may be traced as follows: battery 68, wires 69 and 75, polarized armature 46 in the right hand position, wires 73, 57, 91, 90 and 89, lamp 79, wire 101, polarized armature 48 in the right hand position, wire 99, armature 45, wire 98, armature 42 in its lower position, wires 82 and 71, polarized armature 47 in its right hand position and wire 74 to battery 68. In this case the wire 135 serves as a supply wire for the coils 133, all of which except the coil of the magnet 79$^b$ are connected by the wires 138 to a return wire 141 which is also connected to the wire 101. It will be obvious that all of the magnets will be energized except the magnet 79$^b$ which thus effects the selection of the unit gear connection 79$^a$ operatively to connect the cam shaft 111 to the countershaft 124. As previously explained this gear connection, in the embodiment disclosed, operates to move the cam 110 at an accelerated rate to the position required for the minimum or other particular speed limit.

The fifth circuit condition is established when alternating current only is supplied to the ramp 8. The lamp 80 may be assumed to be responsive to this condition. In this case relay A R is energized but relay D R is deenergized because its stick circuit is broken at the plate 60 by the raising of the shoe 5 by the ramp 8. The armatures 46 to 49 inclusive are in either right or left hand positions, according as the previous energization of the relay D R was negative or positive. Assuming that the last energization of relay D R was negative, so that the armatures 46 to 49 inclusive are in their right hand position, the circuit may be traced as follows: battery 68, wires 69 and 75, armature 46 in the right hand position, wires 73, 57, 91, and 90, lamp 80, wire 102, armature 44 in the lower position, wire 83, armature 42, wires 82 and 71, armature 47 in the right hand position and wire 74 to battery 68. In this case the wire 135 acts as a supply wire to the coils 133 and a wire 142 acts as a return wire for all of said coils except the coil of the magnet 80$^b$. Said magnet being thus deenergized effects the selection of the unit gear connection 80$^a$, which as previously explained operates to move the cam 110 to its minimum or other particular speed limit position but at a retarded rate.

The sixth and final circuit condition is established when no current of any character is supplied to the ramp 8. In this case the relays A R and D R are both deenergized, the armatures 41 to 45, inclusive, are in their lowered positions and the armatures 46 to 49, inclusive, are in either right or left hand positions, accordingly as the previous energization of the relay D R was negative or positive. The lamp 81 may be assumed to be responsive to the circuit condition thus established and the circuit, assuming that the armatures 46 to 49 are in their left hand positions consequent to the last energization of the magnet D R being positive, may be traced as follows: battery 68, wires 69 and 70, armature 47, wires 71 and 82, armature 42, wire 98, armature 45, wire 103, lamp 81, wire 91, wires 57 and 73, armature 46 and wire 74 to battery 68. In this case the wire 135 acts as a return wire for the coils 133 and current is supplied by a wire 143 to all of said coils except the coil of the magnet 81$^b$, the wire 143 being connected to the wire 103. Thereby the magnet 81$^b$ is deenergized and selects the unit gear connection 81$^a$ which effects the movement of the cam 110 at the normal rate to its minimum speed limit position.

I will now describe the means which controls and effects the operation of the speed controlling element, i. e., the cam 110, in accordance with permanent hazards. Such means consists principally of an element having a path of movement corresponding to the run of the vehicle and having a profiled formation which, in the embodiment disclosed, effects the movement of the cam 110 by co-operation with the same shaft, i. e., the cam shaft 111, which is acted on by the means operating responsively to particular track-way conditions. The profiled element may be of any suitable character but as shown and preferred it consists of an endless band 144 having the profile along its upper edge and which is known in the art as a track hazard indicator. The profile varies in distance from a minimum at the uppermost level 145 to a maximum at the lowermost level 146 and its depth is arranged to correspond with the permissive speed of the vehicle at different points along the line of travel, the maximum level corresponding to a maximum speed, the minimum level to a minimum speed and the intermediate levels to intermediate speeds. As examples of permanent hazards requiring sub-maximum permissive speeds may be mentioned villages, curves, railroad and highway crossings and trestles. For co-operation with the profiled element the shaft 111 is provided with a radial arm 147 which carries a laterally directed pin 148 engaging the profiled edge. It will be apparent as the movement of the band proceeds the profile thereof will at times act as a cam on the pin 148 and will turn the shaft 111 and at other times will permit said shaft to be turned by the spring 112. The speed controlling cam 110 participates in such turning movements of the shaft 111 and will act in the manner above described to reduce the speed proportionately to the extent to which it is turned from its normal or maximum speed position. The profiled element is operative to move the cam 110 from its normal position and to continue the speed reducing movement of the cam from any sub-maximum position to which it may have been set by either of the gear connections 77$^a$ or 78$^a$. The various gear connections will in each instance move the cam 110 at a more rapid rate than any part of the profiled edge and consequently there is no liability of the profiled element working in opposition to the gear connections. The profiled element is also operative to control the return movement of the cam 110 to maximum or a higher sub-maximum position. For example if the cam be in minimum speed position and the track-way conditions change whereby it would otherwise return to maximum speed position the profiled element will arrest the return movement of the cam and hold it in the appropriate speed reducing position in case the vehicle be approaching or passing a permanent track-way hazard.

The profiled element is preferably driven from the axle. In the construction disclosed the band 144 is mounted on rollers 149 and the shaft of one of said rollers is provided with a bevel gear 150 which is engaged by either of opposed coupled gears 151 and 152 slidably mounted on a countershaft 153 driven by bevel gearing 154 from the shaft 123. The coupled gears 151 and 152 in accordance with their selective engagement with the gear 150 determine the direction in which the band 144 moves and provide for the reversal of the movement of said band.

It will be understood that no specific description herein contained is intended to impose any limitation upon the scope of the appended claims or to be taken otherwise than for the purpose of exposition.

Having fully described my invention, I claim:

1. In a system of speed control for vehicles, the combination of speed controlling mechanism including selectively operable devices for effecting special operations of train speed control, cab circuits to establish conditions to which said devices are severally responsive, and a track hazard indicator operatively connected to said mechanism, thereby to control the speed of the vehicle in relation to permanent hazards.

2. In a system of speed control for vehicles, the combination of speed controlling mechanism including selectively operable devices for establishing different sub-maximum permissive speeds, cab circuits to establish conditions to which said devices are severally responsive, and a track hazard indicator operatively connected to said mechanism, thereby to control the speed of the vehicle in relation to permanent hazards.

3. In a system of speed control for vehicles, the combination of a controlling element movable to different positions wherein it establishes different limits of permissive speed, selectively operable devices for moving said element to a particular position, cab circuits to establish conditions to which said devices are severally responsive, and a track hazard indicator operatively connected to said controlling element, thereby to control the speed of the vehicle in relation to permanent hazards.

4. In a system of speed control for vehicles, the combination of a controlling element movable to different positions wherein it establishes different limits of permissive speed, an operating shaft for said element, means for establishing different normal closed circuit conditions, devices for effecting different movements of said shaft and normally held inoperative in response to the several closed circuit conditions and a track hazard indicator operatively connected to said controlling element, thereby to control the speed of the vehicle in relation to permanent hazards.

5. In a system of speed control for vehicles, the combination of track-way controlled means for selectively establishing different sub-maximum permissive speeds and a track hazard indicator co-ordinated to said means for establishing different permissive speeds in relation to permanent hazards.

6. In a system of speed control for vehicles, the combination of means for selectively establishing different sub-maximum permissive speeds and a track hazard indicator co-ordinated to said means for establishing different permissive speeds in relation to permanent hazards.

7. A system of speed control having the combination of control mechanism, cab circuit means co-ordinated to said mechanism for the selection of any one of at least three determined operations of said mechanism, means for controlling said cab circuit means in accordance with existing traffic conditions, and means co-ordinated to said mechanism for the selection of particular operations thereof in accordance with permanent track hazards.

8. A system of speed control having the combination of speed control mechanism, cab circuit means co-ordinated to said mechanism for the selection of any one of at least three permissive speeds, means including electrically responsive elements arranged adjacent the trackway for controlling said cab circuit means in accordance with existing traffic conditions, and means co-ordinated to said mechanism for the selection of particular permissive speeds in accordance with permanent track hazards.

In testimony whereof I affix my signature.

PAUL J. SIMMEN.